(12) United States Patent
Wang et al.

(10) Patent No.: US 6,194,708 B1
(45) Date of Patent: Feb. 27, 2001

(54) FOCUS-TYPE ENCODE DEVICE

(76) Inventors: Ching Shun Wang, 2F, No. 550, Min Tsu E. Rd., Taipei; Cheng-Liang Hsieh, 7F, No. 142-1, Lane 108, Sec. 1, Kuang Fu Rd., E. Dist., Hsin Chu; Ming-Hsiang Chu, No. 14, Lane 31, Cheng Kung Rd., Taiping, Taichung Hsien; Yu Shian Liu, 2F, No. 4, Alley 52, Lane 12, Sec. 3, Pa Te Rd., Taipei; Mi-Jung Wang, 7F, No. 20, Lane 25, Chung Cheng N. Rd., Sanchung, Taipei Hsien; Nelson Lai, 6F, No. 104-1, Sec. 5, Hsin Hai Rd., Taipei; Shu Fang Lu, 4F, No.19, Shih Chien St., Peitou, Taipei; You-Yan Yang, No. 1, Sec. 4, Tzu Chiang Rd., Sanchung, Taipei Hsien, all of (TW)

( * ) Notice: Subject to any disclaimer, the term of this patent is extended or adjusted under 35 U.S.C. 154(b) by 0 days.

(21) Appl. No.: 09/328,424

(22) Filed: Jun. 9, 1999

(51) Int. Cl.$^7$ ..................................................... G01D 5/347
(52) U.S. Cl. ................................. 250/231.13; 250/231.14; 250/231.16
(58) Field of Search ........................ 250/231.13, 231.14, 250/231.18, 231.16, 237 G

(56) References Cited

U.S. PATENT DOCUMENTS

| | | | |
|---|---|---|---|
| 3,770,970 | * | 11/1973 | Trump .............................. 250/231.14 |
| 4,820,918 | * | 4/1989 | Igaki et al. ....................... 250/231.13 |
| 5,101,102 | * | 3/1992 | Nishimura et al. ............. 250/231.16 |
| 5,483,059 | * | 1/1996 | Igaki et al. ....................... 250/231.16 |
| 6,100,519 | * | 8/2000 | Wang et al. ..................... 250/231.13 |

* cited by examiner

*Primary Examiner*—Frank G. Font
*Assistant Examiner*—Roy M. Punnoose
(74) *Attorney, Agent, or Firm*—Rosenberg, Klein & Lee

(57) ABSTRACT

An encode device, comprises a light source, an encode wheel and a light detector. A hollow dent is formed on the center part of the incident plane of the encode wheel. The inner circumference of the dent is provided with a ring-shaped lens such that the light impinging on the inner circumference of the dent is focused by the ring-shaped lens. The rim of the encode wheel is provided with a plurality of cylindrical lenses which are perpendicular to the ring-shaped lens such that the light leaving the encode wheel can be further focused. Therefore, the working beam projected toward the chip of the light detector has less interference.

8 Claims, 7 Drawing Sheets

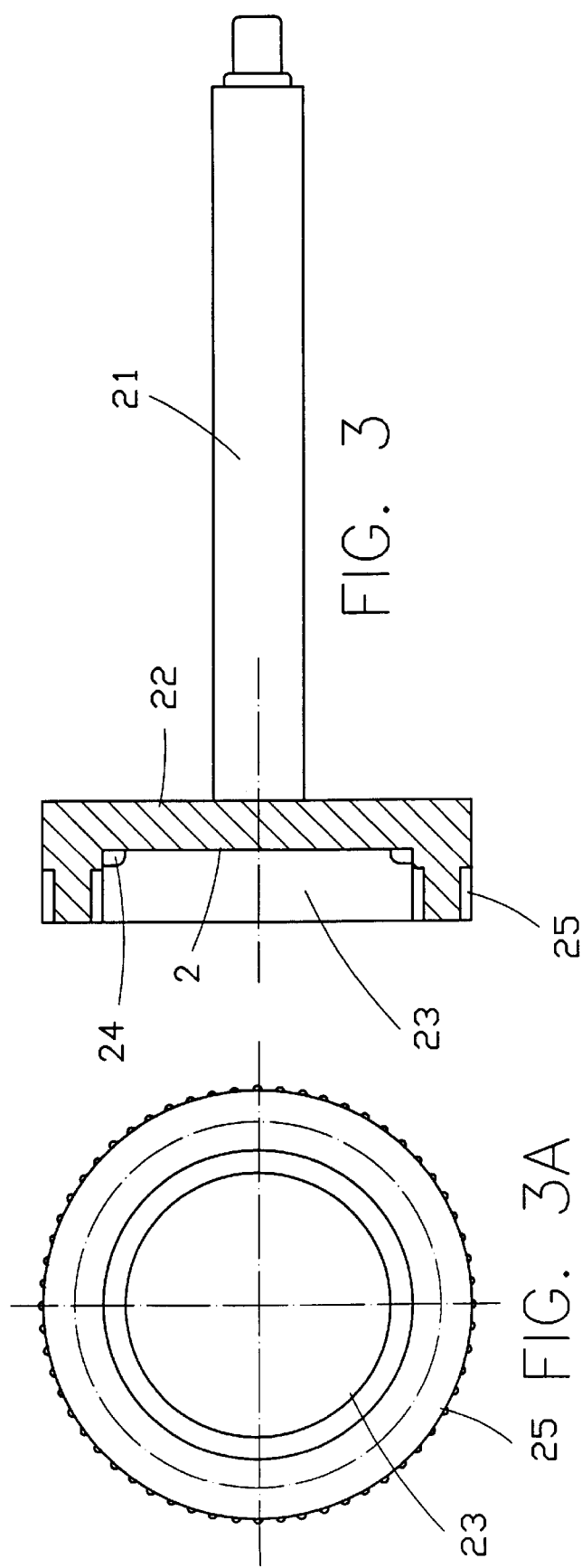

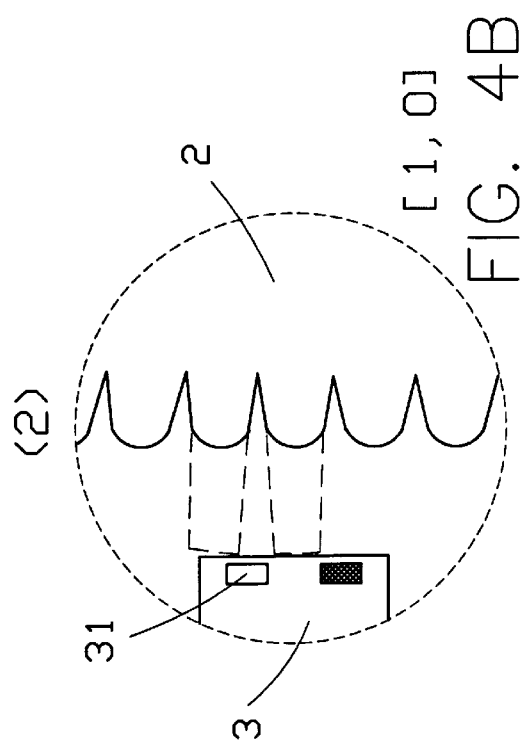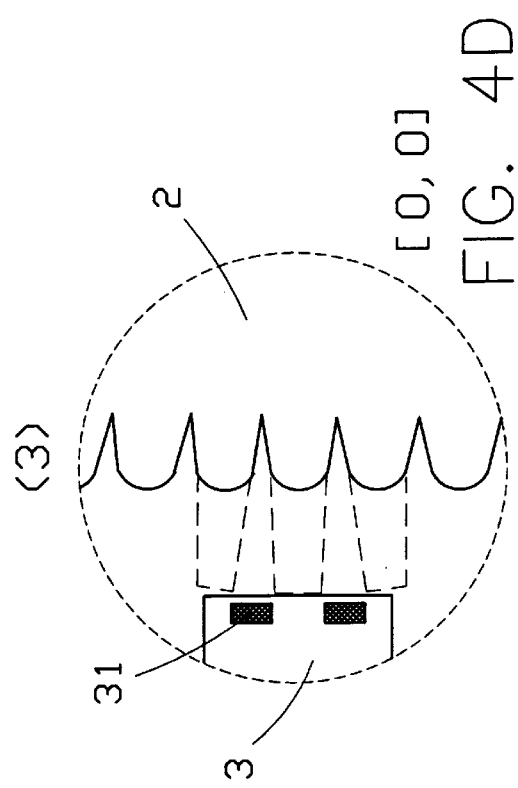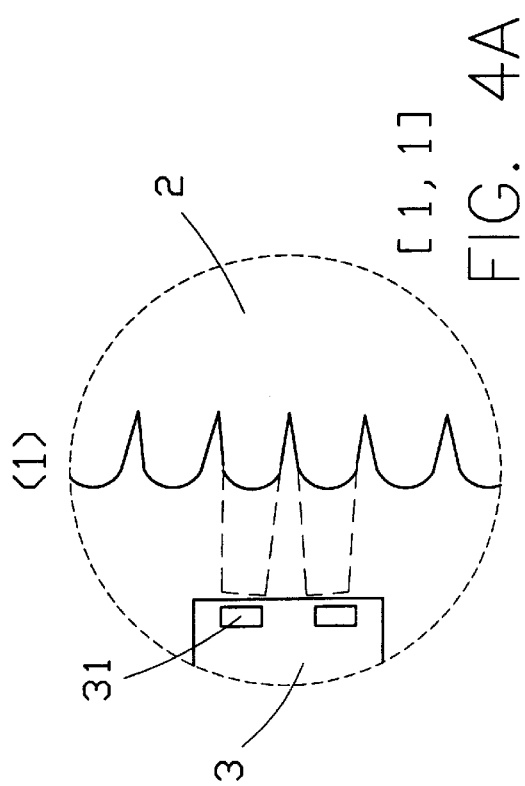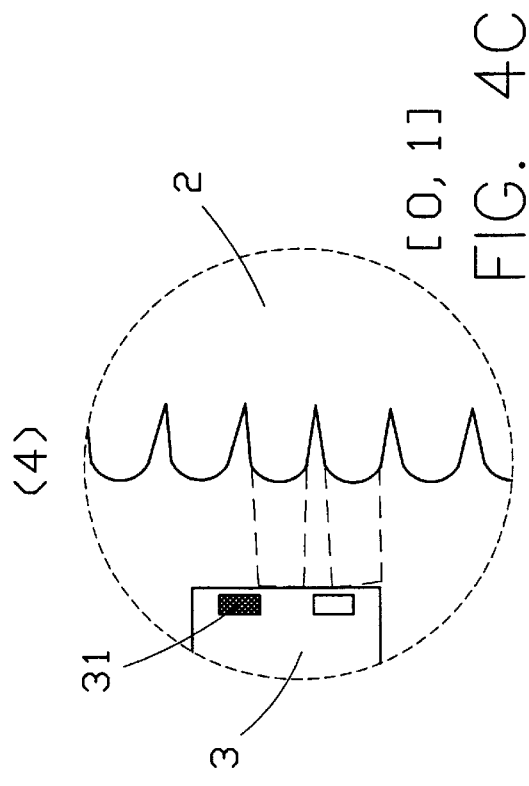

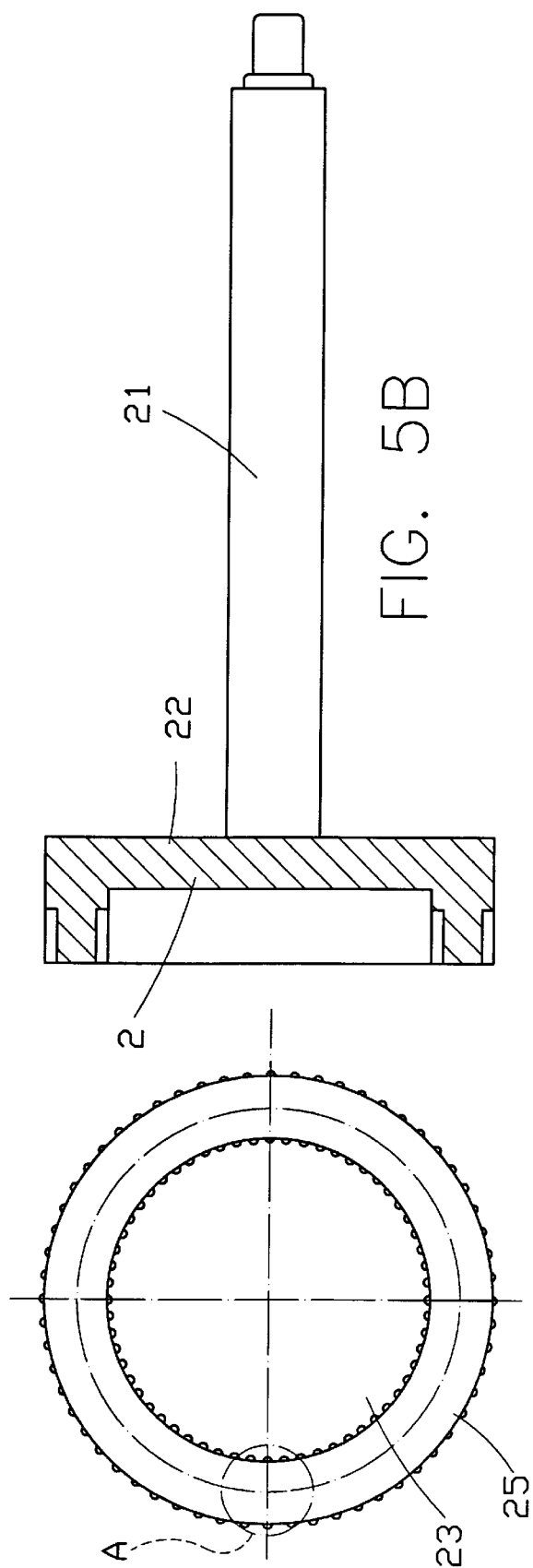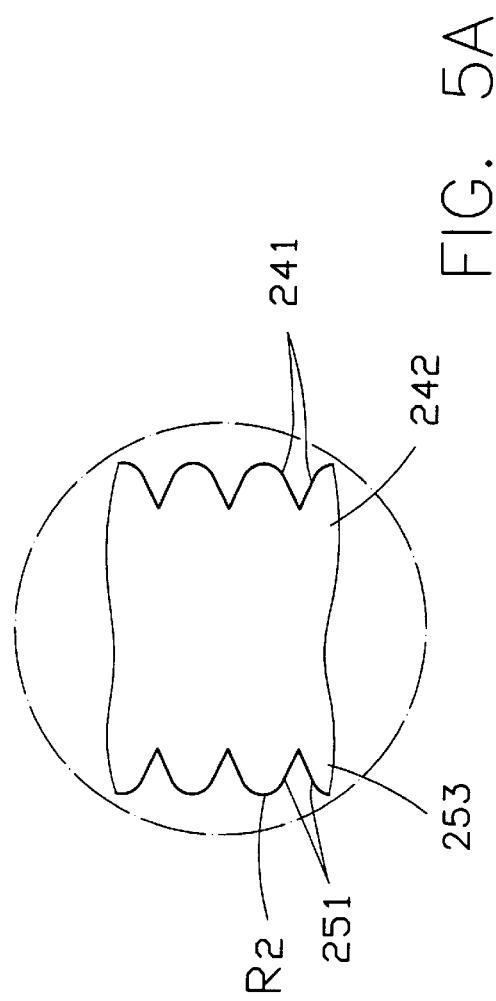
FIG. 5
FIG. 5A
FIG. 5B

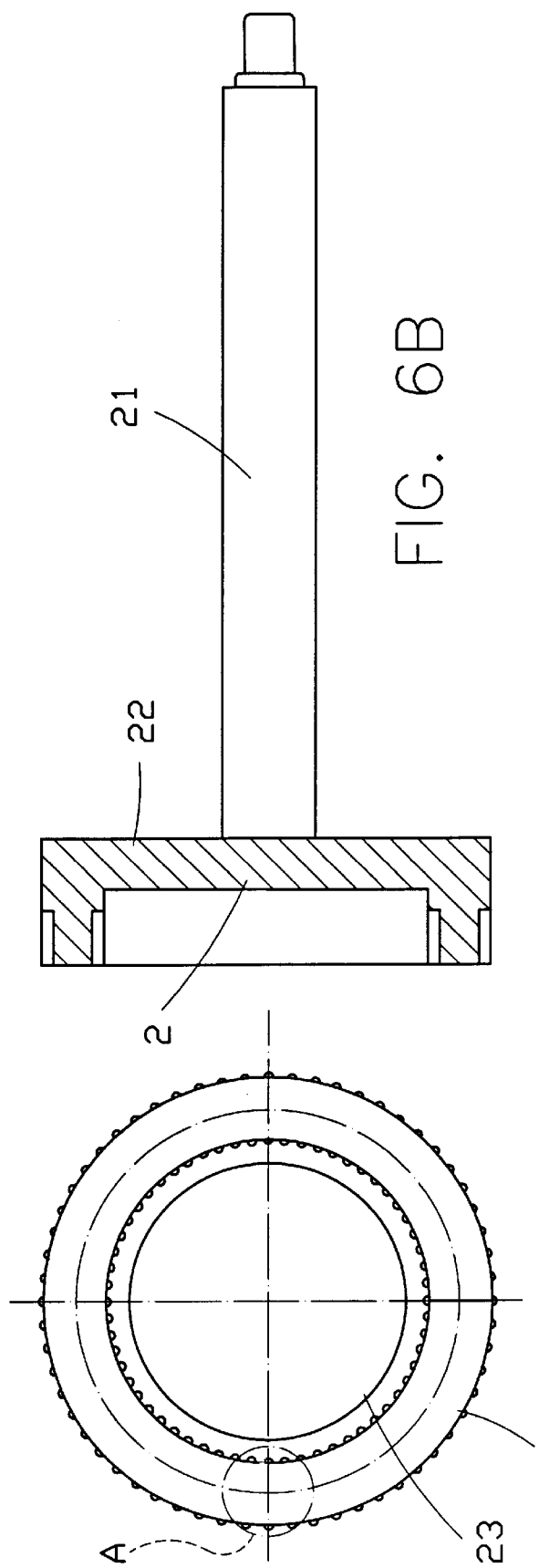

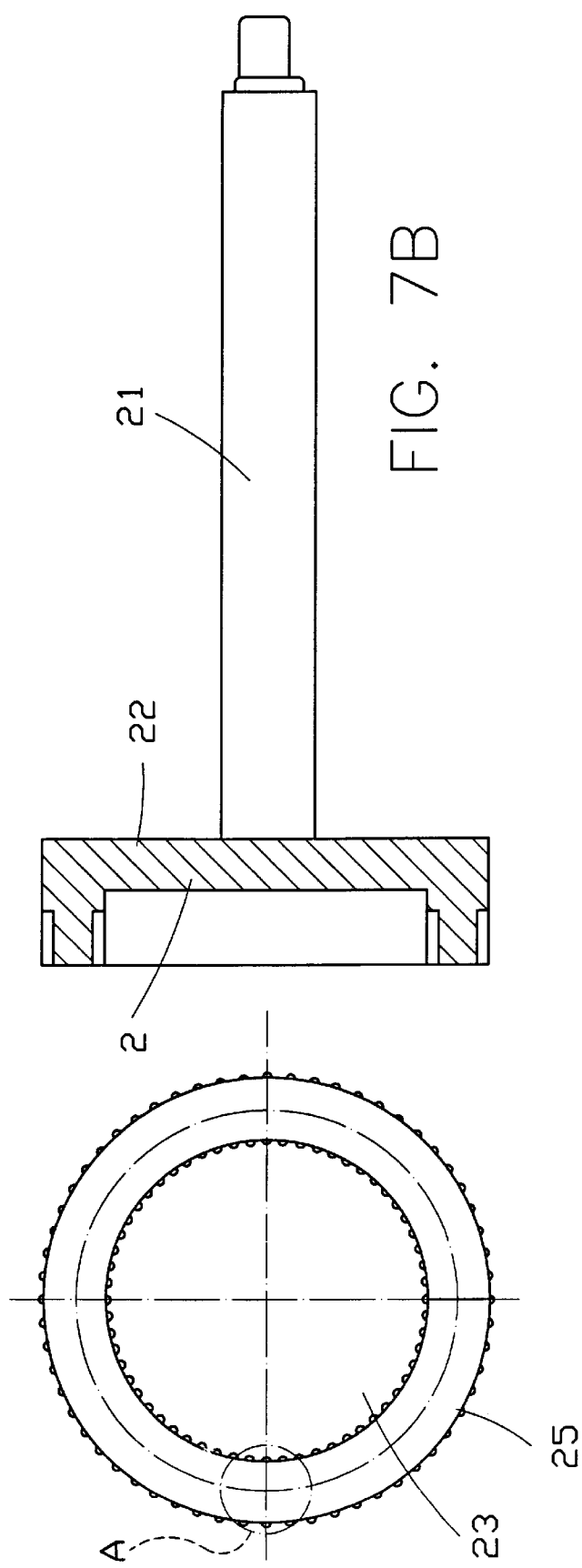

FOCUS-TYPE ENCODE DEVICE

FIELD OF THE INVENTION

The present invention relates to a focus-type encode device, more particularly to an improvement over the encode device in U.S. Pat. No. 6,100,519.

BACKGROUND OF THE INVENTION

As shown in FIG. 1, the encode device in U.S. Pat. No. 6,100,519 comprises a light emitter 1, an encode wheel 2 and a light detector 3. Moreover, a ring-shaped lens 24 is arranged on the incident plane of the encode wheel 2 such that the light from the light emitter 1 and impinging on the incident plane of the encode wheel 2 can be focused by the ring-shaped lens 24. A plurality of cylindrical lens 25 with focusing direction vertical to that of the ring-shaped lens 24 are arranged on the exiting plane of the encode wheel 2 such that the light leaving the exiting plane of the encode wheel 2 can be further focused. Therefore, the working beam projected toward the chip 31 of the light detector 3 has less interference. Moreover, the light detector 3 can be designed to place between the focus point and the lens to prevent the fabrication difficulty and resolution reduction.

However, the encode device in above-mentioned application still has some limitations. For examples, the incident plane and the exiting plane for the working beam should be aligned with the light emitter 1 and the light detector 3. The encode device in above-mentioned application will be not applicable when the light emitter 1 or the light detector 3 is placed on one side of the rim of the encode wheel 2.

It is an object of the present invention to provide an improvement over the encode device in U.S. Pat. No. 6,100,519. A hollow dent is formed on the center part of the incident plane of the encode wheel. The inner circumference of the dent is provided with a ring-shaped lens such that the light impinging on the inner circumference of the dent is focused by the ring-shaped lens. The rim of the encode wheel is provided with a plurality of cylindrical lens which are perpendicular to the ring-shaped lens such that the light leaving the encode wheel can be further focused. Therefore, the working beam projected toward the chip of the light detector has less interference.

The various objects and advantages of the present invention will be more readily understood from the following detailed description when read in conjunction with the appended drawing, in which:

BRIEF DESCRIPTION OF DRAWING

FIG. 3 is the front view and lateral view of the encode device in the present invention.

FIG. 4 shows the quadrant signals observed in an oscilloscope when the encode device in the present invention rotates continuously.

FIG. 5 shows the front view and lateral view of the encode device in the second embodiment of the present invention.

FIG. 6 shows the front view and lateral view of the encode device in the third embodiment of the present invention.

FIG. 7 shows the front view and lateral view of the encode device in the fourth embodiment of the present invention.

DETAIL DESCRIPTION OF PREFERRED EMBODIMENT

Figure 1:
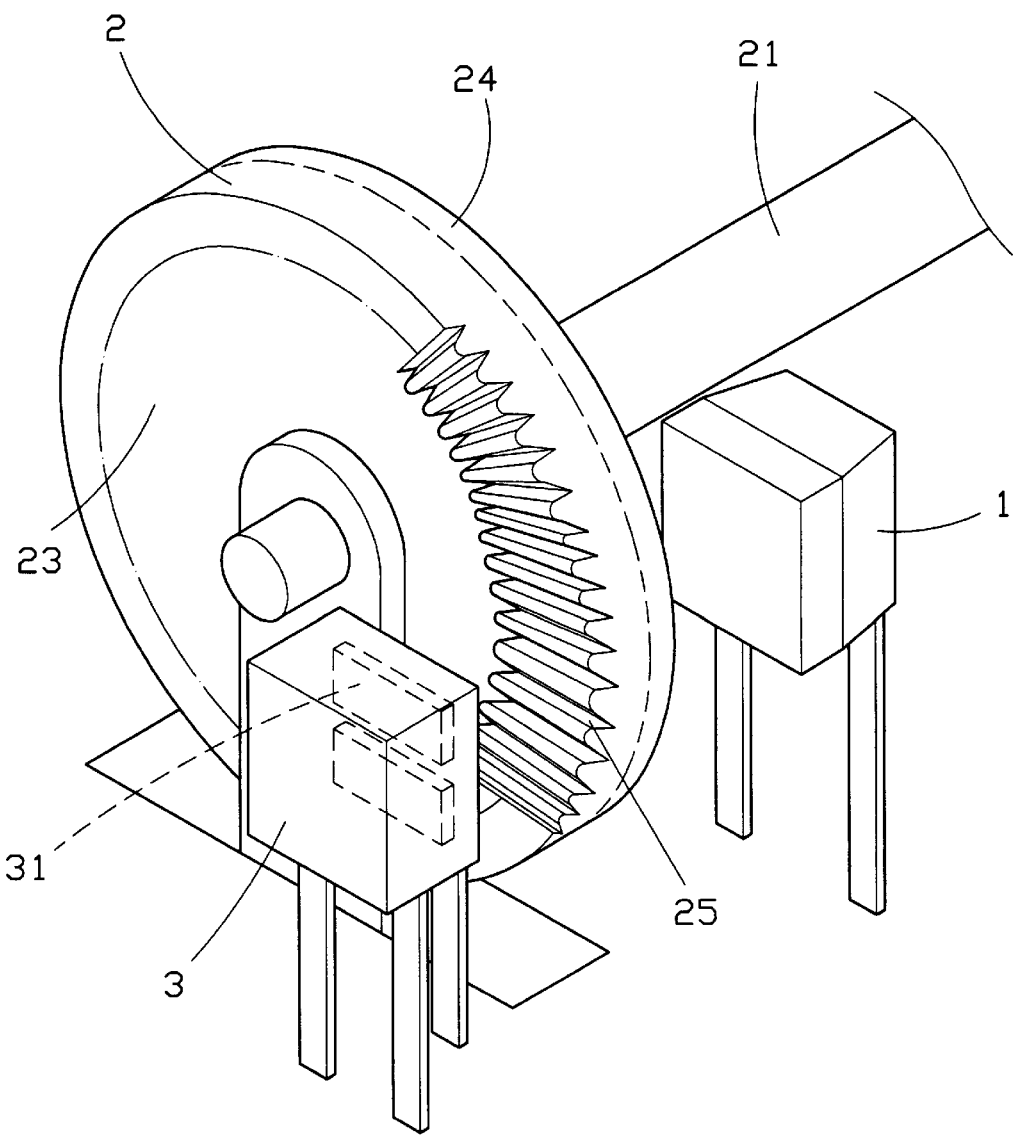
FIG. 1 is the perspective view of the encode device in U.S. Pat. No. 6,100,519.
Figure 2:
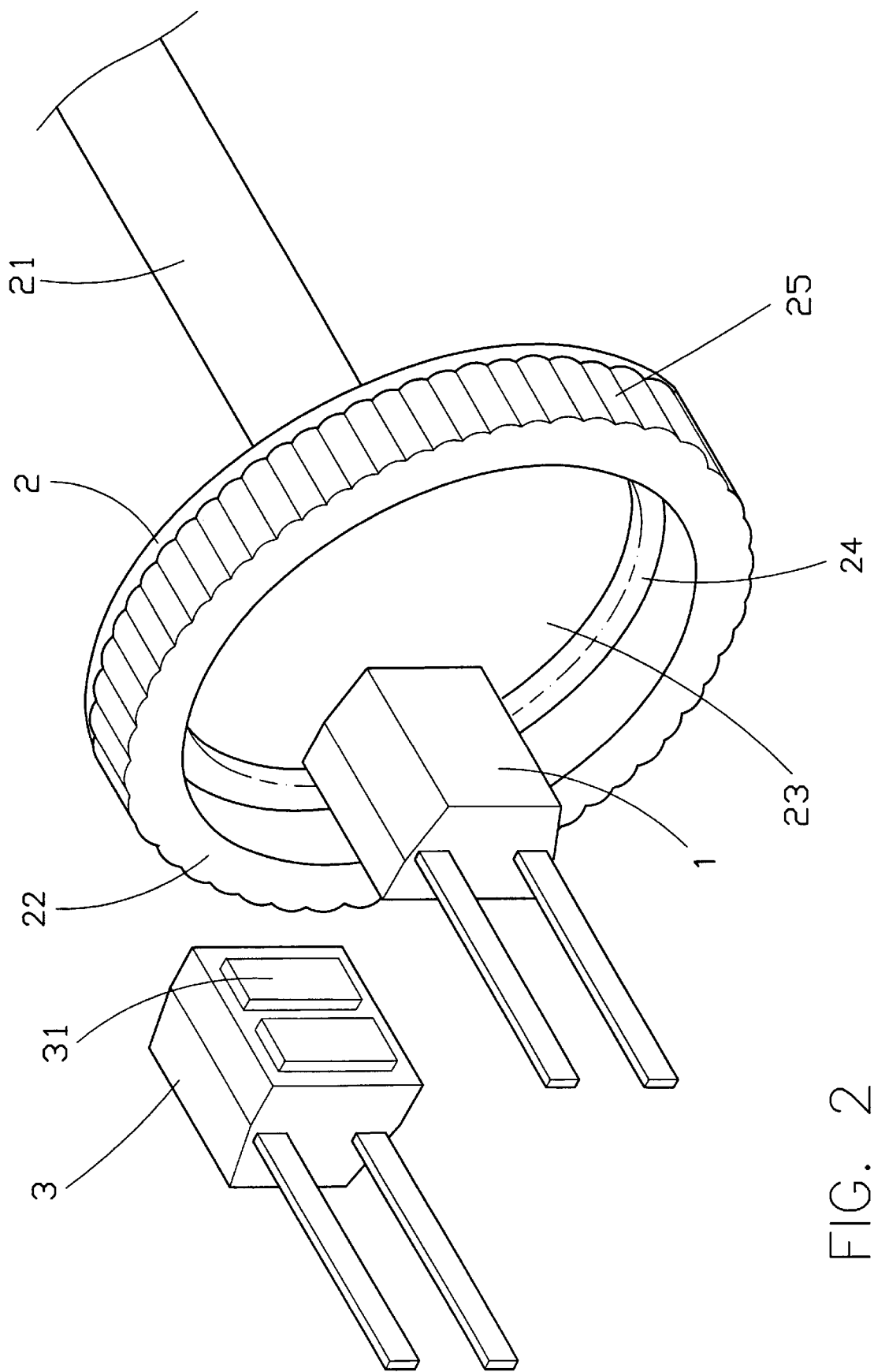
FIG. 2 is the perspective view of the encode device in the present invention.

With reference now to FIGS. 2 and 3, the inventive focus-type encode device comprises a light emitter 1, an encode wheel 2 and a light detector 3.

The encode wheel 2 has a shaft 21 on the center of the incident lane thereof and is rotated by an actuated means such as a tracking ball. More particularly, the shaft 21 of the encode wheel 2 is in contact with the tracking ball and has friction with the tracking ball such that the encode wheel 2 will rotates with the tracking ball. Moreover, a hollow dent 23 is formed on the center part of the incident plane 22 of the encode wheel 2. The inner circumference of the dent 23 is provided with a ring-shaped lens 24 with radius of curvature R (not shown). The light of the light emitter 1 is focused when propagating to the lens 24.

The rim of the encode wheel 2 is provided with a plurality of cylindrical lens 25 which are perpendicular to the ring-shaped lens 24. The convex part 253 or the concave part 251 of the cylindrical lens 25 is coated light blocking material or processed by sand grinding such that an opaque region is formed thereon. The total reflection angle of two adjacent cylindrical lenses 25 is smaller than 41.8 degree and the curvature radius of the cylindrical lens 25 is R2. According to the lens formula $1/f=(1/R1+1/R2)(n-1)$, the focus length of the length 25 depends on the curvature radius R1 and R2.

The light detector 3 made of transparent material is arranged between the focal point and the lens and corresponding to the position of the light emitter 1. The light detector 3 comprises a pair of photo sensing chips 31 arranged on top and bottom sides respectively, which are functioned to receive the working beam from the rim of the encode wheel 2.

The light from the light emitter 1 will be initially focused by the ring-shaped lens 24 when propagating to the inner surface of the dent 23 of the encode wheel 2, and focused again by the cylindrical lens 25 when passing the rim of the encode wheel 2. Therefore, the interference will be minimized when the working beams is projected to the chip 31 of the light detector 3.

The light emitted from the light source 1 is chopped by the alternative light-transmission part and opaque part of the encode and a working beam is formed wheel when the encode wheel is rotated. If the encode wheel 2 is rotated continuously, a sinusoid signal can be generated by the photo sensing chip 31 detecting the working beam. As shown in FIG. 4, the quadrant signals (0,0), (0,1), (1,1) and (1,0) are generated by the chip 31 through a rectifying circuit.

As shown in FIGS. 5 to 7, the ring-shaped lens 24 can be designed to be as tooth-shaped cylindrical lens (FIG. 5), trapezoid-shaped cylindrical lens (FIG. 6) or rectangular lens (FIG. 7). Moreover, the convex part 242 or the concave part 241 is coated with light-blocking material or processed by sand-grinding, thus blocks or reflects the working beam.

To sum up, the inventive encoder can focus the light to the encode wheel with smaller interference and reflect or block the unwanted working beam.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. An encode device, comprising a light source, an encode wheel and a light detector, wherein the light from said source impinging on the incident plane of said encode wheel, said light detector being arranged beside the output plane of said encode wheel, said light detector comprising a pair of adjacent light-sensing chips to receive the light beam from said encode wheel, said encode wheel having a ring-shaped lens on the incident plane thereof and a plurality cylindrical lens arranged on the rim of said encode wheel and with focusing direction normal to that of said ring-shaped lens;

said encode device being characterized in that a hollow dent is arranged on said incident plane of said encode wheel such that said ring-shaped lens is arranged on the inner surface of said cylindrical lens are arranged on the rim of said encode wheel.

2. The encode device as in claim 1, wherein said ring-shaped lens can be replaced by tooth-shaped lens.

3. The encode device as in claim 2, wherein one of the concave or convex portion of said tooth-shaped lens is coated with light-blocking material or light reflecting material or processed by sand-grinding.

4. The encode device as in claim 2, wherein said tooth-shaped lens can be replaced by rectangular lens cylindrical lens.

5. The encode device as in claim 4, wherein one of the concave or convex portion of said rectangular lens is coated with light-blocking material or light reflecting material or processed by sand-grinding.

6. The encode device as in claim 2, wherein said tooth-shaped lens can be replaced by trapezoid-shape cylindrical lens.

7. The encode device as in claim 6, wherein one of the concave or convex portion of said trapezoid-shape cylindrical lens is coated with light-blocking material or light reflecting material or processed by sand-grinding.

8. The encode device as in claim 2, wherein said tooth-shaped lens can be replaced by cylindrical lens.

* * * * *